(12) United States Patent
Shah et al.

(10) Patent No.: US 12,400,162 B2
(45) Date of Patent: Aug. 26, 2025

(54) AUTOMATICALLY GENERATING VISUAL REPRESENTATIONS OF EVENT-DRIVEN INTERCONNECTED SYSTEMS WITHIN A SUPPLY CHAIN ENVIRONMENT

(71) Applicant: Dell Products L.P., Round Rock, TX (US)

(72) Inventors: Purva Shah, Hyderabad (IN); Mohammad Gouse, Visakhapatnam (IN); Niraj Choubey, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 198 days.

(21) Appl. No.: 17/580,058

(22) Filed: Jan. 20, 2022

(65) Prior Publication Data
US 2023/0230003 A1    Jul. 20, 2023

(51) Int. Cl.
*G06Q 10/0631* (2023.01)
(52) U.S. Cl.
CPC .............................. *G06Q 10/06315* (2013.01)
(58) Field of Classification Search
None
See application file for complete search history.

(56) References Cited

U.S. PATENT DOCUMENTS

| | | | | |
|---|---|---|---|---|
| 2015/0120368 A1* | 4/2015 | Agrawal | .......... | G06Q 10/06315 705/7.25 |
| 2015/0120373 A1* | 4/2015 | Bajaj | .................. | G06Q 10/0635 705/7.25 |
| 2017/0236082 A1* | 8/2017 | Davidson | ........... | G06Q 30/0635 705/7.25 |

FOREIGN PATENT DOCUMENTS

EP    1625540 A2 *   2/2006   ............ G06Q 10/08

OTHER PUBLICATIONS

Rick Siow Mong GOH, RiskVis: Supply Chain Visualization with Risk Management and Real-time Monitoring, 2013 IEEE International Conference on Automation Science and Engineering (CASE) (Year: 2013).*

(Continued)

*Primary Examiner* — Jerry O'Connor
*Assistant Examiner* — Matthew H Divelbiss
(74) *Attorney, Agent, or Firm* — Ryan, Mason & Lewis, LLP

(57) ABSTRACT

Methods, apparatus, and processor-readable storage media for automatically generating visual representations of event-driven interconnected systems within a supply chain environment are provided herein. An example computer-implemented method includes populating a data library for a given supply chain environment with historical data pertaining to multiple supply chain-related parameters; generating a visualization of at least a portion of two or more event-driven interconnected systems within the given supply chain environment from a perspective of expected activity of at least one entity within the given supply chain by processing at least a portion of the historical data in the data library; monitoring activity of the at least one entity within the given supply chain; updating the visualization by illustrating at least a portion of the monitored activity relative to at least one corresponding portion of the expected activity of the at least one entity; and performing automated actions based on the updated visualization.

20 Claims, 10 Drawing Sheets

(56) References Cited

OTHER PUBLICATIONS

Wikipedia, React (JavaScript Library), https://en.wikipedia.org/w/index.php?title=React_(JavaScript_library)&oldid=1066248653 , Jan. 17, 2022.
Wikipedia, D3.js, https://en.wikipedia.org/w/index.php?title=D3.js&oldid=1066518941 , Jan. 18, 2022.
Wikipedia, TypeScript, https://en.wikipedia.org/w/index.php?title=TypeScript&oldid=1065652624 , Jan. 14, 2022.

* cited by examiner

FIG. 4

```
GET: /api/getStableOrderItems
Response:
[
        {
                "asn": "JUL10000001"
        },
        {
                "asn": "JUL10000002"
        }
]
```

FIG. 5

```
GET: /api/channelItems/<entityValue>
Sample URL: /api/channelItems/100101

Response:
[
        {
                "channelName": "FOOE"
        },
        {
                "channelName": "BOSS"
        }
]
```

FIG. 6

```
GET: /api/stateItems/<entityValue>

Response:
[
        {
                "stateId": 0,
                "stateName": "NULL"
        },
        {
                "stateId": 201,
                "stateName": "ODMASNPERSISTED"
        },
        {
                "stateId": 202,
                "stateName": "ODMASNSERVICEAVILABLE"
        }
]
```

FIG. 7

```
stateTransitionId is unique
GET: /api/actualEventItems/<entityValue>

Response:
[
        {
                "eventId": 3110, /// inbound event
                "stateTransitionId": 1011,
                "currentStateId": 0, /// starts at a state
                "nextStateId": 1043 /// ends at a state
        },
        {
                "eventId": 5000,
                "stateTransitionId": 1012,
                "currentStateId": 1043,
                "nextStateId": 1076
        }
]
```

FIG. 8    ⟵ 800

```
GET: /api/channelEventItems/<entityValue>

Response:
[
            {
                        "eventId": 3110,
                        "channelName": "BOSS", /// from channel
                        "currentStateId": 0 /// to state
                        "stateTransitionEvent": "Y" ///
            },
            {
                        "eventId": 5000,
                        "channelName": "GOLF",
                        "currentStateId": 1043,
                        "stateTransitionEvent": "Y" ///
            }
            {
                        "eventId": 3130,
                        "channelName": "BOSS",
                        "currentStateId": NULL,
                        "stateTransitionEvent": "N" /// Log event
            }
]
```

FIG. 9

```
GET: /api/actionItems/<entityValue>

Response:
[
    {
            "actionLogId": 8001, /// transition id
            "actionName":
            "ASN_PORECEIPT_BOSS_TO_PRM_DAO",
            "stateId": 0, /// current state id
            "channelName": "BOSS" /// to channel
            "actionStatus": null
    },
    {
            "actionLogId": 8011,
            "actionName":
            "ASN_BOSS_PERSTED_TO_FSL_DAO",
            "stateId": 201,
            "channelName": 101
            "status": "Error: Shipping failed" /// when action fails
    }
]
```

FIG. 10

```
State Includes all expected from master table state_master

GET: /api/eventItems/<entityValue>

Response:
[
    {
                    "eventId": 3110,  /// inbound event
                    "stateTransitionId": 1011,
                    "currentStateId": 0,  /// starts at a state
                    "nextStateId": 1043  /// ends at a state

},
    {

"eventId": 5000,
                    "stateTransitionId": 1012,
                    "currentStateId": 1043,
                    "nextStateId": 1076

}
]
```

AUTOMATICALLY GENERATING VISUAL REPRESENTATIONS OF EVENT-DRIVEN INTERCONNECTED SYSTEMS WITHIN A SUPPLY CHAIN ENVIRONMENT

FIELD

The field relates generally to information processing systems, and more particularly to techniques for processing distributed data using such systems.

BACKGROUND

System interactions within a supply chain environment can be complex, and the flow of entities and transitions with corresponding workflows across the systems can be varied and/or dynamic. Stakeholders (e.g., business users, analysts, architects, developers, etc.) often wish to determine how current systems are behaving and how various changes might affect such behaviors.

However, conventional supply chain data processing approaches fail to represent entire supply chain environment flows via a single visualization tool. Such conventional approaches typically require users to attempt to utilize sets of limited disparate techniques, which is time-consuming and prone to errors and/or inaccuracies.

SUMMARY

Illustrative embodiments of the disclosure provide techniques for automatically generating visual representations of event-driven interconnected systems within a supply chain environment. An exemplary computer-implemented method includes populating at least one data library for a given supply chain environment with historical data pertaining to multiple supply chain-related parameters, and generating a visualization of at least a portion of two or more event-driven interconnected systems within the given supply chain environment from a perspective of expected activity of at least one entity within the given supply chain by processing at least a portion of the historical data in the at least one data library. The method also includes monitoring activity of the at least one entity within the given supply chain, updating the visualization by illustrating at least a portion of the monitored activity relative to at least one corresponding portion of the expected activity of the at least one entity, and performing one or more automated actions based at least in part on the updated visualization.

Illustrative embodiments can provide significant advantages relative to conventional supply chain data processing approaches. For example, problems associated with time delays and inaccuracies are overcome in one or more embodiments through dynamically generating and updating a visualization of event-driven interconnected systems within a supply chain environment from the perspective of at least one entity within the supply chain.

These and other illustrative embodiments described herein include, without limitation, methods, apparatus, systems, and computer program products comprising processor-readable storage media.

BRIEF DESCRIPTION OF THE DRAWINGS

FIG. 4 shows an example code snippet for implementing entity values to populate a search box in an illustrative embodiment.

FIG. 5 shows an example code snippet for implementing channel items in an illustrative embodiment.

FIG. 6 shows an example code snippet for implementing state items in an illustrative embodiment.

FIG. 7 shows an example code snippet for implementing actual state transitions in an illustrative embodiment.

FIG. 8 shows an example code snippet for implementing actual inbound event items in an illustrative embodiment.

FIG. 9 shows an example code snippet for implementing action items in an illustrative embodiment.

FIG. 10 shows an example code snippet for implementing state transitions in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
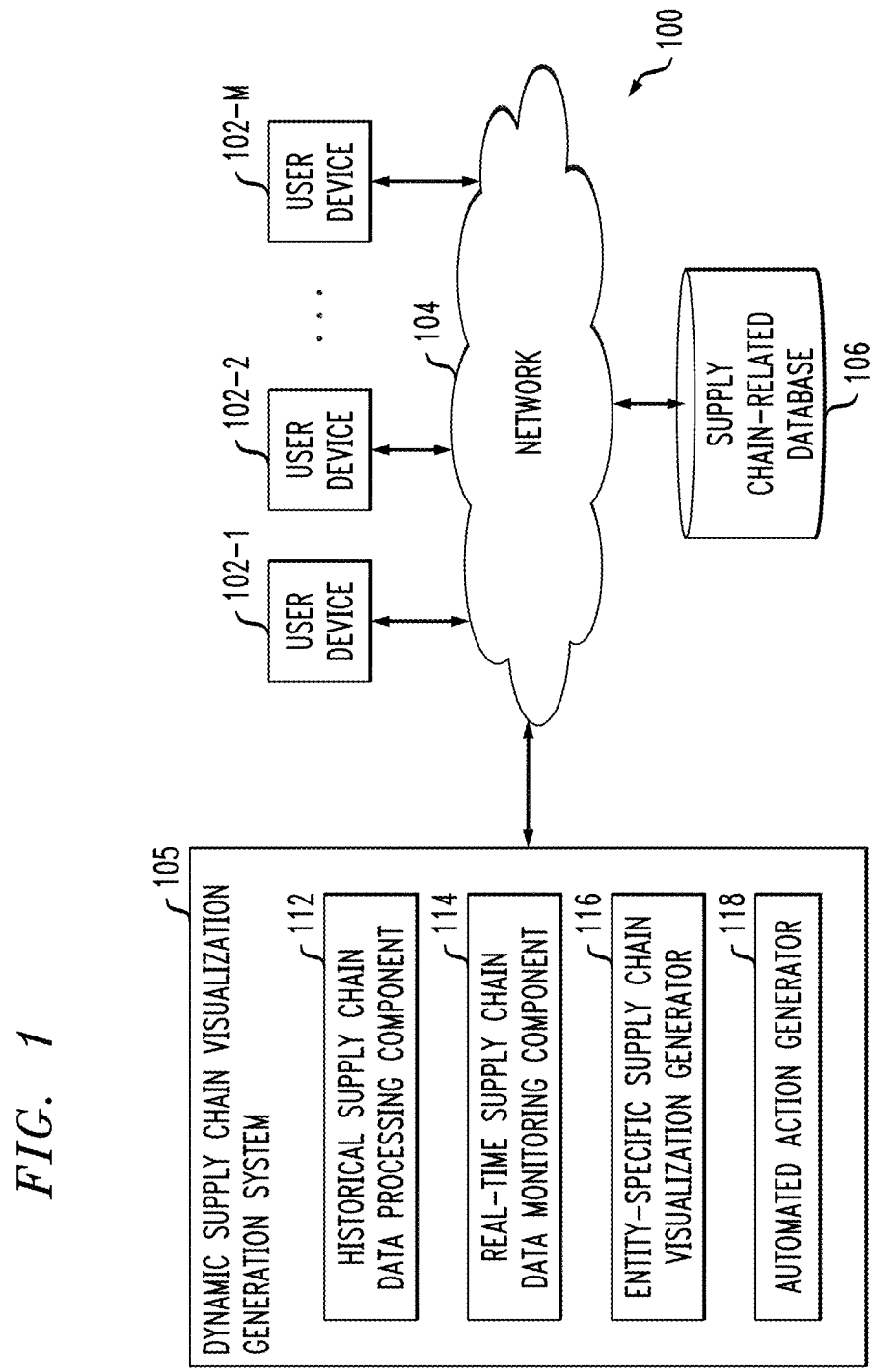
FIG. 1 shows an information processing system configured for automatically generating visual representations of event-driven interconnected systems within a supply chain environment in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is dynamic supply chain visualization generation system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, dynamic supply chain visualization generation system 105 can have an associated supply chain-related database 106 configured to store data pertaining to orders, entities, processes, resources, etc. related to one or more given supply chain environments.

The supply chain-related database 106 in the present embodiment is implemented using one or more storage systems associated with dynamic supply chain visualization generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with dynamic supply chain visualization generation system 105 are one or more input-output devices, which illustratively comprise keyboards, displays or other types of input-output devices in any combination. Such input-output devices can be used, for example, to support one or more user interfaces to dynamic supply chain visualization generation system 105, as well as to support communication between dynamic supply chain visualization generation system 105 and other related systems and devices not explicitly shown.

Additionally, dynamic supply chain visualization generation system 105 in the FIG. 1 embodiment is assumed to be implemented using at least one processing device. Each such processing device generally comprises at least one processor and an associated memory, and implements one or more functional modules for controlling certain features of dynamic supply chain visualization generation system 105.

More particularly, dynamic supply chain visualization generation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows dynamic supply chain visualization generation system 105 to communicate over the network 104 with the user devices 102, and illustratively comprises one or more conventional transceivers.

The dynamic supply chain visualization generation system 105 further comprises historical supply chain data processing component 112, real-time supply chain data monitoring component 114, entity-specific supply chain visualization generator 116, and automated action generator 118.

It is to be appreciated that this particular arrangement of elements 112, 114, 116 and 118 illustrated in the dynamic supply chain visualization generation system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automatically generating visual representations of event-driven interconnected systems within a supply chain environment involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, dynamic supply chain visualization generation system 105 and supply chain-related database 106 can be on and/or part of the same processing platform.

An exemplary process utilizing elements 112, 114, 116 and 118 of an example dynamic supply chain visualization generation system 105 in computer network 100 will be described in more detail with reference to the flow diagram of FIG. 11.

Accordingly, at least one embodiment includes automatically generating visual representations of event-driven interconnected systems within a supply chain environment. For example, such an embodiment can include producing a dynamic representation of one or more event-driven interconnected systems for any entity within a given supply chain environment in a single visualization and/or pictorial view. One or more embodiments includes building a library that can interpret at least one given dataset and provide the state transition information, action trigger information, and event information, along with data pertaining to actual behavior versus expected behavior for any entity in the given supply chain environment.

As used herein, an event refers to the information and/or activity occurring in one or more systems. By way merely of example, consider items added to a virtual shopping cart, shipping information added to a system, inventory blocking for a given item, payment processing, payment confirmation, shipment processing, order delivery, etc.; such elements would be events that provide information and/or activity data.

As also used herein, a state refers to a set of processes which need to happen in a sequence (i.e., not randomly). By way merely of example, an illustrative state might indicate that an order cannot be delivered without payment being completed, and payment can be completed only when checkout of a virtual shopping cart is completed.

Additionally, as used herein, an action trigger refers to a set of actions when a given state transition occurs. By way of example, after adding items to a virtual shopping cart and moving to payment processing, an action trigger can be implemented with respect to a notification system, wherein the notification system is triggered to generate and output a text message and/or an email to the corresponding customer indicating that payment processing has been initiated. Once the payment is completed, such an example can include sending an additional trigger to the same notification system to initiate a text message and/or email to the customer indicating that payment has been completed, and, in parallel, a trigger would be sent to the inventory system to block the inventory for the item(s) that need(s) to be delivered to the customer. Such a set of actions can occur in background when an event is processed and a state transition subsequently happens.

Accordingly, as further detailed herein, at least one embodiment includes providing an end-to-end visualization of an entire supply chain environment with respect to state transitions, action triggers, and events, as well as determining and providing actual behavior versus expected behavior for entities within the supply chain environment (which can, for example, expedite one or more supply chain-related analyses). In carrying out such functions, one or more embodiments include defining at least one dataset. Such a dataset can include multiple entity values (e.g., sales orders, work orders, advanced shipment notifications (ASNs), shipment notifications (SNs), etc.), expected state transition data (e.g., values pertaining to the different states to process events), and actual inbound event data from multiple channels (e.g., fulfillment order orchestration engine (FOOE), buy online, ship-to-store (BOSS), global outbound and logistics fulfillment (GOLF), fulfillment service layer (FSL), one or more inventory systems (e.g., PRISM), computer information systems (CIS), etc.). For each entity such as, for example, SN, ASN, work order (WO), etc., there can be different state transitions. For instance, consider a state transition for a WO, wherein an expected state transition would include a sequence of values of WOCREATION, WONOTIFY, MFGWOSENT, MFGWOACK, WOACK, MFGWOSCH, MFGWOBS, etc. Additionally, expected sate transition data can include an exact flow of data for a given profile. For example, if an entity has to move from Point A to D, the entity should always go in the expected sequence from Point A to Point B, from Point B to Point C, and from Point C to Point D, touching all of the points.

Such a dataset can also include lines and/or other graphical indicators connecting to actual states, for example, starting from 0 and proceeding to an end state, in actual sequence order. Additionally or alternatively, such a dataset can include actual state transition data (e.g., information pertaining to an actual sequence of events received in a state transition and business logic execution (STABLE) system). Actual state transition data can include data pertaining to how the current flow is happening in the event-driven supply chain system. For instance, consider an example including four different events, A, B, C, and D, and any of these events can come in any order. The system would be able to connect those points only if the expected state transition flow maps exactly with the actual state.

In connection with a dataset such as noted above, one or more embodiments include determining one or more workflow triggers by processing state transitions for multiple events, and also determining all expected transition paths from one or more states to one or more (different) states. In such an embodiment, workflows are mapped when the expected state transition path is successfully completed.

Accordingly, by processing at least a portion of the above-noted dataset(s) and/or the noted determinations, at least one embodiment includes generating an encompassing visualization pertaining to the corresponding supply chain environment, as further detailed herein.

Figure 2:
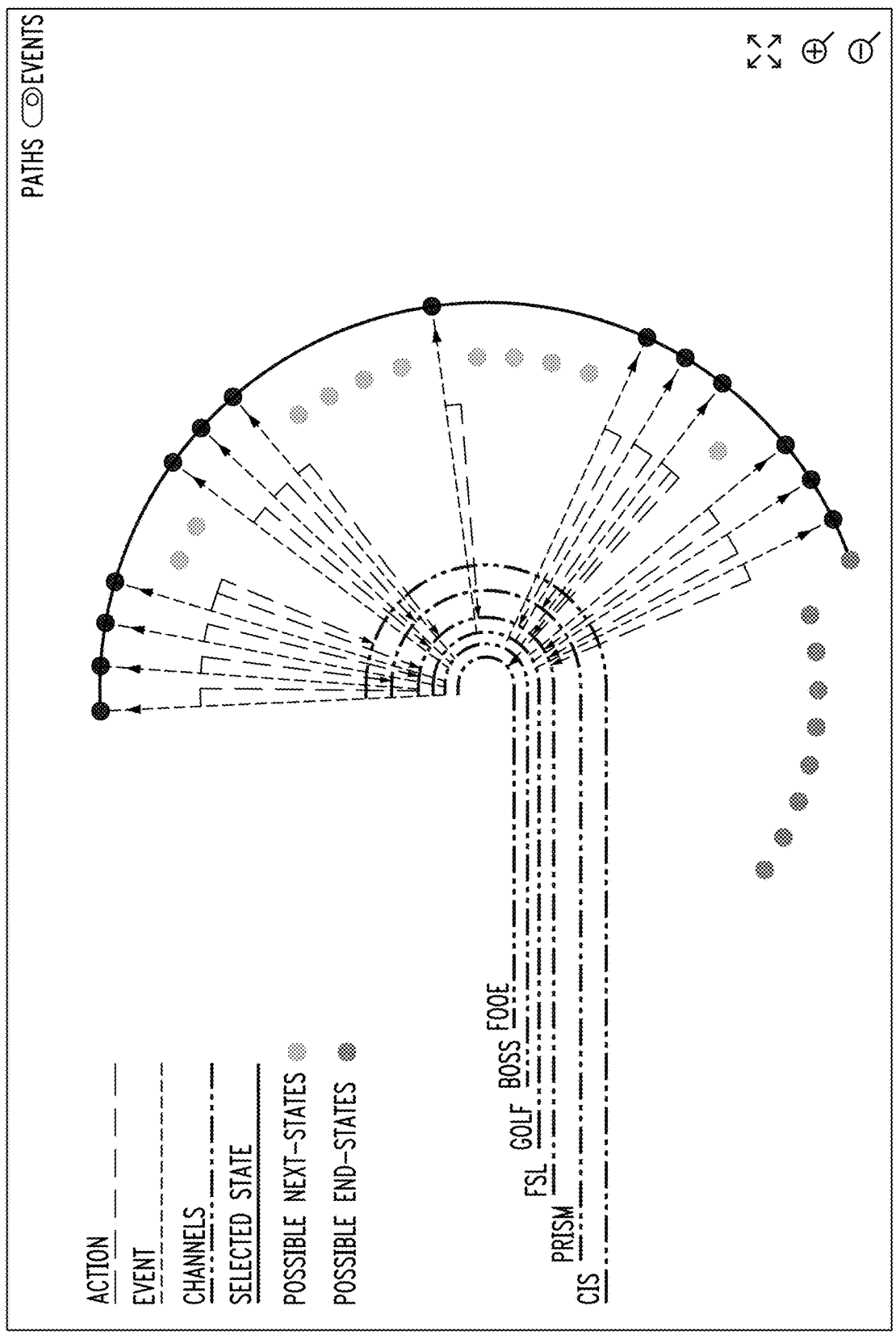
FIG. 2 shows an example output of an illustrative embodiment.

FIG. 2 shows an example output of an illustrative embodiment. By way of illustration, FIG. 2 depicts a comprehensive view 220 of a given supply chain environment by generating a visual flow from where one or more given events and/or actions originated and/or progressed through, which state(s) has/have been associated with the flow, and which channel (s) and/or application(s) the event and/or action has triggered. Based at least on processing one or more portions of the corresponding dataset generated (e.g., state transition data and event data), such an embodiment can include determining the actual flow that is occurring as well as the expected flow.

As such, and as detailed herein, one or more embodiments include enabling visibility of an entire sequence of state transitions along with actual versus expected outcomes corresponding to one or more portions of the sequence. Such an embodiment can include, for example, implementing event handling and state transition processing using at least one STABLE system, which receives event information as an input from multiple applications (FOOE, PRISM, FSL, GOLF, etc.). Such evening information can include, for example, data pertaining to activities that occurred in the given system, entity type information, entity value, the channel(s) where that event was triggered, etc. Whenever there is an internal status change and/or any process triggered to one or more outside systems, there is an associated internal state transition and an associated actionable workflow to trigger the output event to one or more applications to carry out the subsequent fulfillment process, and this process will continue until an end state of the entity is reached between multiple applications via the STABLE system.

As detailed herein, one or more embodiments include generating a visualization encompassing actual state transition data versus expected state transition data in a single view by producing and/or processing a library which uses at least one well-defined dataset such as further described herein (e.g., including entity values, expected state transition information, actual inbound event information from various channels, actual state transition information, workflow triggers, expected transition paths, etc.). Such a library, in at least one embodiment, can be integrated with at least one STABLE system and the resulting visualization can be viewed, for example, as part of the STABLE user interface (UI).

Figure 3:
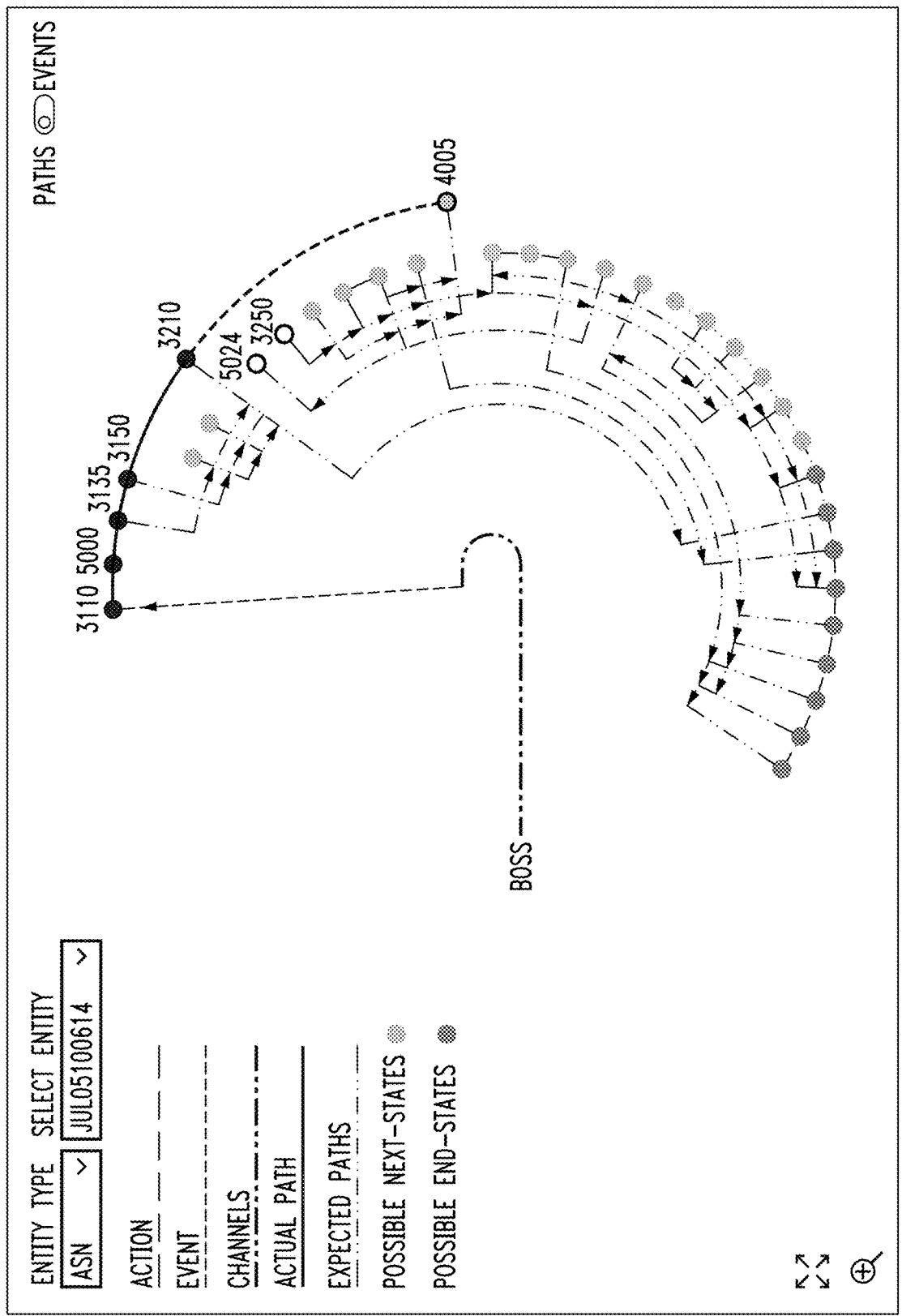
FIG. 3 shows an example output of an illustrative embodiment.

FIG. 3 shows an example output of an illustrative embodiment. By way of illustration, FIG. 3 depicts an example visualization 320 that illustrates actual state transitions versus expected state transitions (for one or more entities within a given supply chain environment) in a single view. For example, the dotted line event from state 3210 to state 4005 is not the expected behavior, as it is represented as actual behavior on how the flow is occurring. As such, in example visualization 320, this has been represented as being moved to a deferred state (i.e., state 4005, represented by a light gray filled circle boarded by solid line), whereas from state 3110 to state 5000, from state 5000 to state 3135, from state 3135 to state 3150, and from state 3150 to state 3210, the actual state transition flow and the expected state transition flow are the same (so none of the events went to a deferred state).

As illustrated in the example embodiment of FIG. 3, such an embodiment includes providing comprehensive supply chain-related data in a single view (integrated with a STABLE system visualization) in connection with dynamic and/or real-time with actual flow data versus expected flow data for at least one given entity participating in and/or associated with the given supply chain. Such a visualization output can assist and/or facilitate identification of one or more supply chain-related issues, and can also facilitate and/or trigger one or more automated actions related to and/or in response to such identified issues. By way merely of example, an ASN may need to be acknowledged to a logistics team to move a given truck from outside of a given factory. Also, a related operations team will monitor the ASNs, as the operations team has to move at least a portion of the ASNs to different systems in the supply chain domain to receive one or more acknowledgments (ACK). An issue can be raised, for example, when an ACK is not sent in accordance with a given service level agreement (SLA). Accordingly, the operations team has to identify in each system what has happened to an ASN and why the ASN got stuck and what needs to be done by moving to different systems. By implementing a visual flow representation in one or more embodiments, the operations team will know from where the event came through and which state it has been moved to, and to which channel or application the action has been triggered.

Additionally or alternatively, the visualization generated by such an embodiment can facilitate analysis of processes while onboarding (in connection with the given supply chain) one or more new products, performing at least one change in a fulfillment process (e.g., business continuity plans (BCPs), disaster recovery plans, etc.), and/or facilitating one or more shipping or manufacturing route changes.

Such embodiments include expediting identification of supply chain-related issues as well as carrying out remedial actions (e.g., automated remedial actions) in response to such issues (e.g., one or more business process changes). Additionally, such embodiments provide a single visualization which dynamically illustrates expected outcomes versus actual outcomes in connection with the behavior of events, states, and actions through a given supply chain environment. The visualization can also provide a representation from where a given event came, whether a corresponding state is deferred or not, and what action(s) has/have been triggered in connection therewith.

Also, at least one embodiment includes generating and/or maintaining a reusable library (such as detailed above and herein) that can be used by one or more event-driven distributed systems (e.g., systems with complex system interactions). Such a library can be used and reused to provide at least one necessary dataset for dynamically generating a single visualization for a given supply chain environment for viewing, monitoring, and/or analyzing system interactions wherein events are triggered, state transitions change across and/or within workflows. Accordingly, in such an embodiment, a collection of events, state transitions, and results of one or more actions within a supply chain environment can be clearly viewed.

FIG. 4 shows an example code snippet for implementing entity values to populate a search box in an illustrative embodiment. In this embodiment, example code snippet 400 is executed by or under the control of at least one processing system and/or device. For example, the example code snippet 400 may be viewed as comprising a portion of a software implementation of at least part of dynamic supply chain visualization generation system 105 of the FIG. 1 embodiment.

The example code snippet 400 illustrates using a web service (e.g., a representational state transfer (REST) protocol) to obtain the entities (e.g., ASN) to view with a given flow.

It is to be appreciated that this particular example code snippet shows just one example implementation of utilizing entity values to populate a search box, and alternative implementations of the process can be used in other embodiments.

FIG. 5 shows an example code snippet for implementing channel items in an illustrative embodiment. In this embodiment, example code snippet 500 is executed by or under the control of at least one processing system and/or device. For example, the example code snippet 500 may be viewed as comprising a portion of a software implementation of at least part of dynamic supply chain visualization generation system 105 of the FIG. 1 embodiment.

The example code snippet 500 illustrates example channel items, which can be represented, for instance, by the hooks at the center of the FIG. 2 and FIG. 3 visualizations. As detailed herein, one or more embodiments include determining and/or displaying what is happening across different systems with respect to a given entity. For example, consider a scenario wherein a customer has ordered some item through a web portal. In the background, the order will move to different systems (e.g., sales, inventory, payroll, logistics, etc.) to book and confirm the order, and each system will pass events to indicate the progress of the order. An example embodiment can include determining which system has passed which event, and similarly, the example code snippet 500 of FIG. 5 is related to given channels providing information pertaining to what is occurring with a given entity.

It is to be appreciated that this particular example code snippet shows just one example implementation of utilizing channel items, and alternative implementations of the process can be used in other embodiments.

FIG. 6 shows an example code snippet for implementing state items in an illustrative embodiment. In this embodiment, example code snippet 600 is executed by or under the control of at least one processing system and/or device. For example, the example code snippet 600 may be viewed as comprising a portion of a software implementation of at least part of dynamic supply chain visualization generation system 105 of the FIG. 1 embodiment.

The example code snippet 600 illustrates example state items, which can be represented, for instance, by the dots on the circumference of the FIG. 2 and FIG. 3 visualizations.

Additionally, such state items can include actual states, expected states, and end states. More specifically, example code snippet 600 depicts a contract to the visualization flow on how state transitions should happen.

It is to be appreciated that this particular example code snippet shows just one example implementation of utilizing state items, and alternative implementations of the process can be used in other embodiments.

FIG. 7 shows an example code snippet for implementing actual state transitions in an illustrative embodiment. In this embodiment, example code snippet 700 is executed by or under the control of at least one processing system and/or device. For example, the example code snippet 700 may be viewed as comprising a portion of a software implementation of at least part of dynamic supply chain visualization generation system 105 of the FIG. 1 embodiment.

The example code snippet 700 illustrates examples of actual state transitions (also referred to as actual event items), which can be represented in the FIG. 2 and/or FIG. 3 visualizations, for instance, by lines connecting actual states in actual sequence order.

It is to be appreciated that this particular example code snippet shows just one example implementation of utilizing actual state transitions, and alternative implementations of the process can be used in other embodiments.

FIG. 8 shows an example code snippet for implementing actual inbound event items in an illustrative embodiment. In this embodiment, example code snippet 800 is executed by or under the control of at least one processing system and/or device. For example, the example code snippet 800 may be viewed as comprising a portion of a software implementation of at least part of dynamic supply chain visualization generation system 105 of the FIG. 1 embodiment.

The example code snippet 800 illustrates examples of actual inbound event items (also referred to as channel event items), which can be represented in the FIG. 2 and/or FIG. 3 visualizations, for instance, by lines associated with events triggered from at least one channel to at least one state.

It is to be appreciated that this particular example code snippet shows just one example implementation of utilizing actual inbound event items, and alternative implementations of the process can be used in other embodiments.

FIG. 9 shows an example code snippet for implementing action items in an illustrative embodiment. In this embodiment, example code snippet 900 is executed by or under the control of at least one processing system and/or device. For example, the example code snippet 900 may be viewed as comprising a portion of a software implementation of at least part of dynamic supply chain visualization generation system 105 of the FIG. 1 embodiment.

The example code snippet 900 illustrates example action items, which can be represented in the FIG. 2 and/or FIG. 3 visualizations, for instance, by lines associated with actions from at least one state to at least one channel.

It is to be appreciated that this particular example code snippet shows just one example implementation of utilizing action items, and alternative implementations of the process can be used in other embodiments.

FIG. 10 shows an example code snippet for implementing state transitions in an illustrative embodiment. In this embodiment, example code snippet 1000 is executed by or under the control of at least one processing system and/or device. For example, the example code snippet 1000 may be viewed as comprising a portion of a software implementation of at least part of dynamic supply chain visualization generation system 105 of the FIG. 1 embodiment.

The example code snippet 1000 illustrates example state transitions (also referred to as event items), which can be represented in the FIG. 2 and/or FIG. 3 visualizations, for instance, by lines associated with expected transitions and/or paths from states to states. Also, in one or more embodiments, such state transitions are a superset of at least one application programming interface (API) for actual state transitions (e.g., as depicted in FIG. 7).

It is to be appreciated that this particular example code snippet shows just one example implementation of utilizing state transitions, and alternative implementations of the process can be used in other embodiments.

Figure 11:
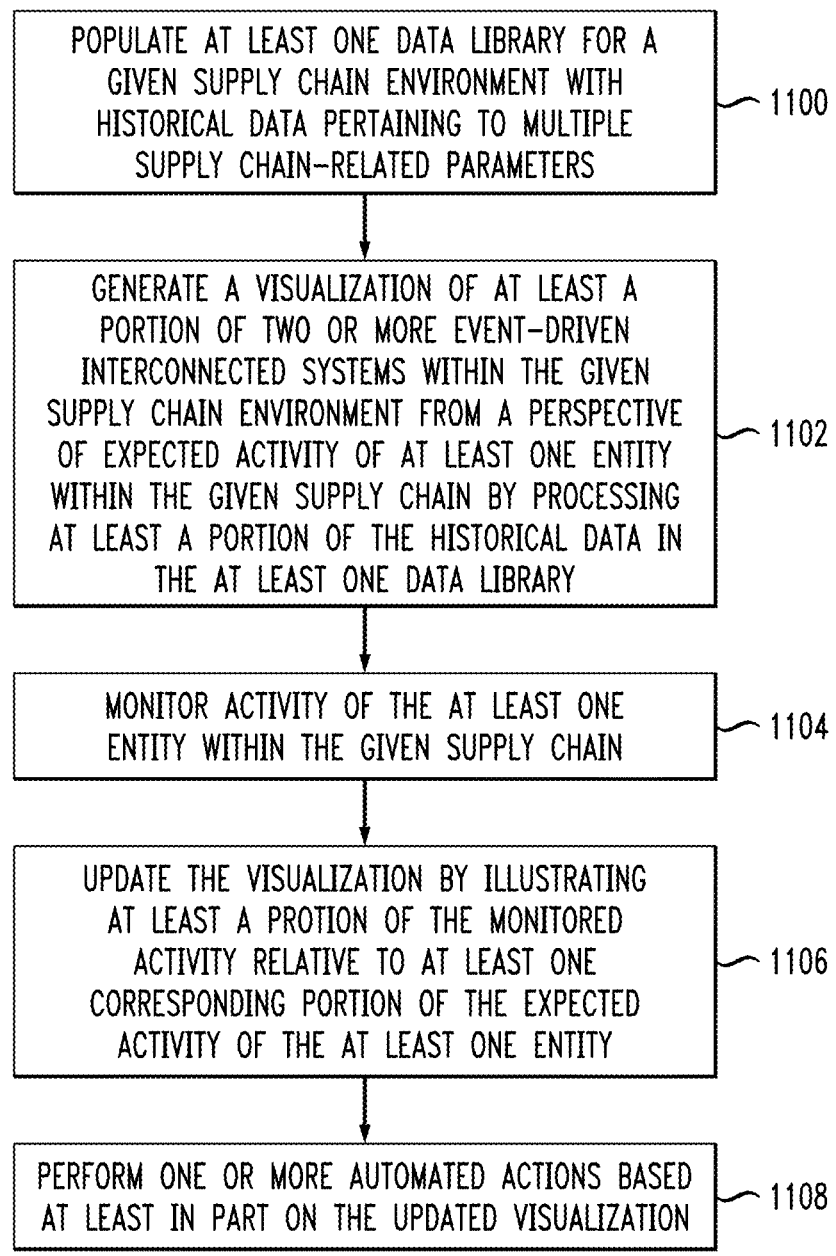
FIG. 11 is a flow diagram of a process for automatically generating visual representations of event-driven interconnected systems within a supply chain environment in an illustrative embodiment.

FIG. 11 is a flow diagram of a process for automatically generating visual representations of event-driven interconnected systems within a supply chain environment in an illustrative embodiment. It is to be understood that this particular process is only an example, and additional or alternative processes can be carried out in other embodiments.

In this embodiment, the process includes steps 1100 through 1108. These steps are assumed to be performed by dynamic supply chain visualization generation system 105 utilizing elements 112, 114, 116 and 118.

Step 1100 includes populating at least one data library for a given supply chain environment with historical data pertaining to multiple supply chain-related parameters. In one or more embodiments, the historical data pertaining to multiple supply chain-related parameters can include historical data pertaining to two or more of sales orders, work orders, advanced shipment notifications, shipment notifications, and values pertaining to one or more states to process one or more events.

Step 1102 includes generating a visualization of at least a portion of two or more event-driven interconnected systems within the given supply chain environment from a perspective of expected activity of at least one entity within the given supply chain by processing at least a portion of the historical data in the at least one data library. In at least one embodiment, generating the visualization includes generating an end-to-end visualization of the entire given supply chain from a perspective of expected activity of at least one entity within the given supply chain. Also, in one or more embodiments, processing at least a portion of the historical data in the at least one data library includes processing historical data pertaining to state transition information, action trigger information, and event information. In such an embodiment, monitoring activity of the at least one entity within the given supply chain can include monitoring activity of the at least one entity with respect to at least one of one or more state transitions, one or more action triggers, and one or more events.

Additionally or alternatively, generating the visualization can include determining one or more workflow triggers by processing state transitions for multiple events and/or determining one or more expected transition paths from one or more states to one or more different states.

Step 1104 includes monitoring activity of the at least one entity within the given supply chain. In at least one embodiment, monitoring activity of the at least one entity includes monitoring inbound event data from multiple channels associated with the given supply chain. In such an embodiment, monitoring inbound event data from multiple channels associated with the given supply chain can include monitoring inbound event data from two or more of at least one fulfillment order orchestration engine, at least one global outbound and logistics fulfillment system, at least one fulfillment service layer, and at least one inventory system.

Step 1106 includes updating the visualization by illustrating at least a portion of the monitored activity relative to at least one corresponding portion of the expected activity of the at least one entity. Step 1108 includes performing one or more automated actions based at least in part on the updated visualization. In at least one embodiment, performing one or more automated actions includes identifying one or more supply chain-related issues. In such an embodiment, performing one or more automated actions can also include initiating one or more remedial actions in response to identifying the one or more supply chain-related issues.

Accordingly, the particular processing operations and other functionality described in conjunction with the flow diagram of FIG. 11 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically generate visual representations of event-driven interconnected systems within a supply chain environment. These and other embodiments can effectively overcome problems associated with time delays and inaccuracies.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
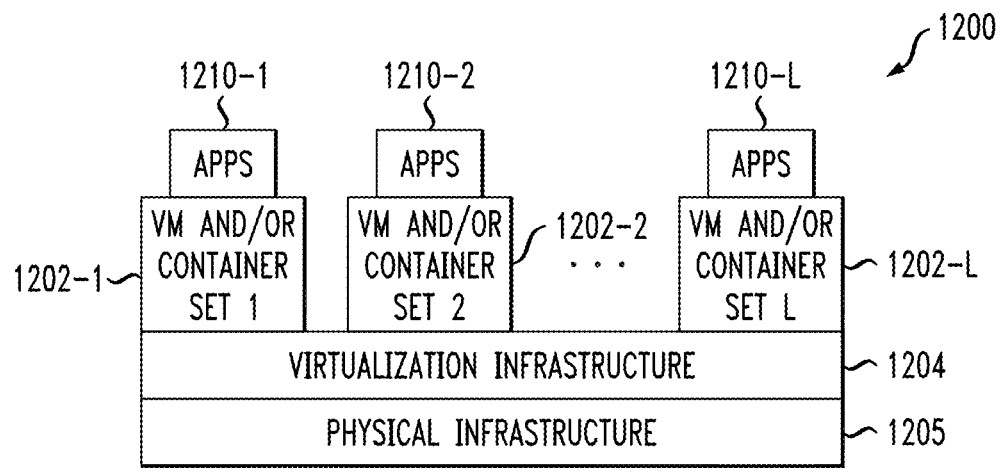
FIGS. 12 and 13 show examples of processing platforms that may be utilized to implement at least a portion of an information processing system in illustrative embodiments.
Figure 13:
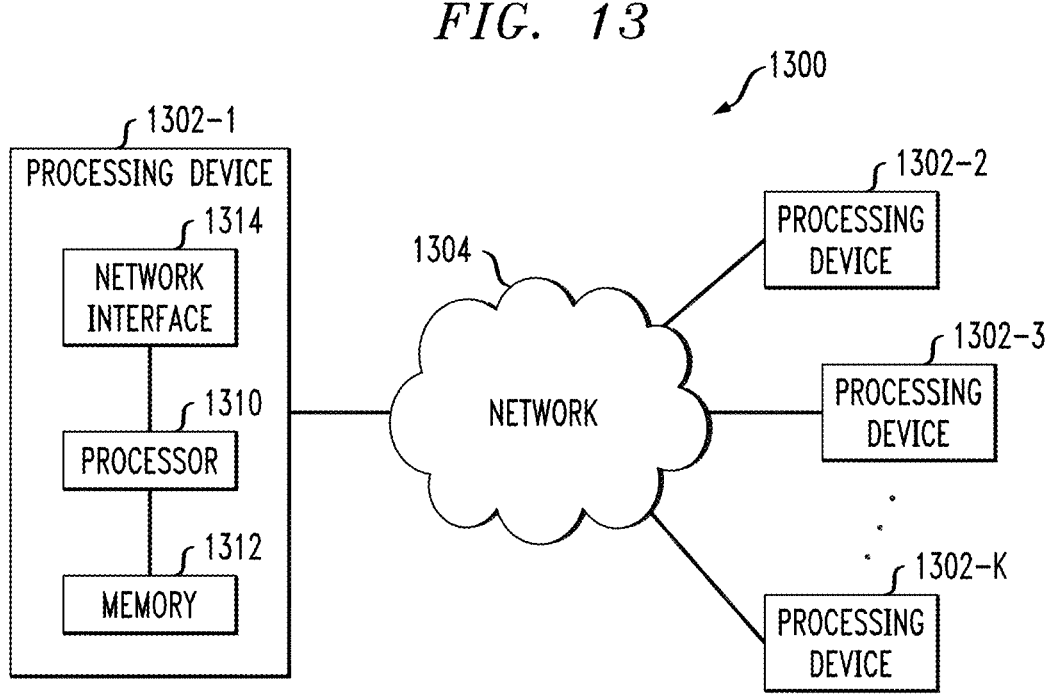

FIG. 12 shows an example processing platform comprising cloud infrastructure 1200. The cloud infrastructure 1200 comprises a combination of physical and virtual processing resources that are utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 comprise respective VMs, respective sets of one or more containers, or respective sets of one or more containers running in VMs. In some implementations of the FIG. 12 embodiment, the VMs/container sets 1202 comprise respective VMs implemented using virtualization infrastructure 1204 that comprises at least one hypervisor.

A hypervisor platform may be used to implement a hypervisor within the virtualization infrastructure 1204, wherein the hypervisor platform has an associated virtual infrastructure management system. The underlying physical machines comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1302-1 in the processing platform 1300 comprises a processor 1310 coupled to a memory 1312.

The processor 1310 comprises a microprocessor, a CPU, a GPU, a TPU, a microcontroller, an ASIC, a FPGA or other type of processing circuitry, as well as portions or combinations of such circuitry elements.

The memory 1312 comprises random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
populating at least one data library for a given supply chain environment with alphanumeric historical data pertaining to multiple supply chain-related parameters;
generating an end-to-end visualization across two or more distributed event-driven interconnected systems representing an entirety of the given supply chain environment from a perspective of expected state transition data of at least one entity within the given supply chain versus actual state transition data of the at least one entity within the given supply chain by transforming at least a portion of the alphanumeric historical data in the at least one data library into graphical data representing entity-related activity across the at least a portion of the two or more distributed event-driven interconnected systems, wherein generating the visualization comprises determining, using at least one application programming interface, expected transition paths of the at least one entity from one or more states to one or more different states across the two or more distributed event-driven interconnected systems, and representing the expected transition paths in the visualization using at least a portion of the transformed graphical data;

monitoring alphanumeric activity-related data associated with the at least one entity within the given supply chain, wherein monitoring alphanumeric activity-related data associated with the at least one entity comprises processing alphanumeric activity-related data from multiple applications associated with the given supply chain, wherein the alphanumeric activity-related data comprises entity type information attributed to the at least one entity, entity value information attributed to the at least one entity, and identifying information of one or more channels within the given supply chain wherein the alphanumeric activity-related data was triggered, and wherein the multiple applications associated with the given supply chain comprise at least a plurality of one or more fulfillment-related applications, one or more inventory-related applications, one or more shipment-related applications, and one or more orchestration-related applications;

updating the visualization by transforming at least a portion of the monitored alphanumeric activity-related data into graphical data representing entity-related activity across the at least a portion of the two or more distributed event-driven interconnected systems relative to at least one corresponding portion of the expected state transition data of the at least one entity; and performing, in connection with at least one of the two or more distributed event-driven interconnected systems, one or more automated actions based at least in part on the updated visualization, wherein performing one or more automated actions comprises using at least one processing device to identify one or more anomalies in the entity-related activity and automatically execute one or more remedial actions on the at least one of the two or more distributed event-driven interconnected systems in response to identifying the one or more anomalies;

wherein the method is performed by the at least one processing device comprising a processor coupled to a memory.

2. The computer-implemented method of claim 1, wherein processing at least a portion of the historical data in the at least one data library comprises processing historical data pertaining to state transition information, action trigger information, and event information.

3. The computer-implemented method of claim 2, wherein monitoring alphanumeric activity-related data associated with the at least one entity within the given supply chain comprises monitoring alphanumeric activity-related data associated with the at least one entity with respect to at least one of one or more state transitions, one or more action triggers, and one or more events.

4. The computer-implemented method of claim 1, wherein generating the visualization comprises determining one or more workflow triggers by processing state transitions for multiple events.

5. The computer-implemented method of claim 1, wherein monitoring alphanumeric activity-related data associated with the at least one entity comprises monitoring inbound event data from multiple channels associated with the given supply chain.

6. The computer-implemented method of claim 5, wherein monitoring inbound event data from multiple channels associated with the given supply chain comprises monitoring inbound event data from two or more of at least one fulfillment order orchestration engine, at least one global outbound and logistics fulfillment system, at least one fulfillment service layer, and at least one inventory system.

7. The computer-implemented method of claim 1, wherein the historical data pertaining to multiple supply chain-related parameters comprise historical data pertaining to two or more of sales orders, work orders, advanced shipment notifications, shipment notifications, and values pertaining to one or more states to process one or more events.

8. A non-transitory processor-readable storage medium having stored therein program code of one or more software programs, wherein the program code when executed by at least one processing device causes the at least one processing device:

to populate at least one data library for a given supply chain environment with alphanumeric historical data pertaining to multiple supply chain-related parameters;

to generate an end-to-end visualization across two or more distributed event-driven interconnected systems representing an entirety of the given supply chain environment from a perspective of expected state transition data of at least one entity within the given supply chain versus actual state transition data of the at least one entity within the given supply chain by transforming at least a portion of the alphanumeric historical data in the at least one data library into graphical data representing entity-related activity across the at least a portion of the two or more distributed event-driven interconnected systems, wherein generating the visualization comprises determining, using at least one application programming interface, expected transition paths of the at least one entity from one or more states to one or more different states across the two or more distributed event-driven interconnected systems, and representing the expected transition paths in the visualization using at least a portion of the transformed graphical data;

to monitor alphanumeric activity-related data associated with the at least one entity within the given supply chain, wherein monitoring alphanumeric activity-related data associated with the at least one entity comprises processing alphanumeric activity-related data from multiple applications associated with the given supply chain, wherein the alphanumeric activity-related data comprises entity type information attributed to the at least one entity, entity value information attributed to the at least one entity, and identifying information of one or more channels within the given supply chain wherein the alphanumeric activity-related data was triggered, and wherein the multiple applications associated with the given supply chain comprise at least a plurality of one or more fulfillment-related applications, one or more inventory-related applications, one or more shipment-related applications, and one or more orchestration-related applications;

to update the visualization by transforming at least a portion of the monitored alphanumeric activity-related data into graphical data representing entity-related activity across the at least a portion of the two or more distributed event-driven interconnected systems relative to at least one corresponding portion of the expected state transition data of the at least one entity; and to perform, in connection with at least one of the two or more distributed event-driven interconnected systems, one or more automated actions based at least in part on the updated visualization, wherein performing one or more automated actions comprises using the at least one processing device to identify one or more anomalies in the entity-related activity and automatically execute one or more remedial actions on the at least one of the two or more distributed event-driven interconnected systems in response to identifying the one or more anomalies.

9. The non-transitory processor-readable storage medium of claim 8, wherein processing at least a portion of the historical data in the at least one data library comprises processing historical data pertaining to state transition information, action trigger information, and event information.

10. The non-transitory processor-readable storage medium of claim 9, wherein monitoring alphanumeric activity-related data associated with the at least one entity within the given supply chain comprises monitoring alphanumeric activity-related data associated with the at least one entity with respect to at least one of one or more state transitions, one or more action triggers, and one or more events.

11. The non-transitory processor-readable storage medium of claim 8, wherein monitoring alphanumeric activity-related data associated with the at least one entity comprises monitoring inbound event data from multiple channels associated with the given supply chain.

12. The non-transitory processor-readable storage medium of claim 11, wherein monitoring inbound event data from multiple channels associated with the given supply chain comprises monitoring inbound event data from two or more of at least one fulfillment order orchestration engine, at least one global outbound and logistics fulfillment system, at least one fulfillment service layer, and at least one inventory system.

13. The non-transitory processor-readable storage medium of claim 8, wherein the historical data pertaining to multiple supply chain-related parameters comprise historical data pertaining to two or more of sales orders, work orders, advanced shipment notifications, shipment notifications, and values pertaining to one or more states to process one or more events.

14. The non-transitory processor-readable storage medium of claim 8, wherein generating the visualization comprises determining one or more workflow triggers by processing state transitions for multiple events.

15. An apparatus comprising:
at least one processing device comprising a processor coupled to a memory;
the at least one processing device being configured:
to populate at least one data library for a given supply chain environment with alphanumeric historical data pertaining to multiple supply chain-related parameters;
to generate an end-to-end visualization across two or more distributed event- driven interconnected systems representing an entirety of the given supply chain environment from a perspective of expected state transition data of at least one entity within the given supply chain versus actual state transition data of the at least one entity within the given supply chain by transforming at least a portion of the alphanumeric historical data in the at least one data library into graphical data representing entity-related activity across the at least a portion of the two or more distributed event-driven interconnected systems, wherein generating the visualization comprises determining, using at least one application programming interface, expected transition paths of the at least one entity from one or more states to one or more different states across the two or more distributed event-driven interconnected systems, and representing the expected transition paths in the visualization using at least a portion of the transformed graphical data;
to monitor alphanumeric activity-related data associated with the at least one entity within the given supply chain, wherein monitoring alphanumeric activity-related data associated with the at least one entity comprises processing alphanumeric activity-related data from multiple applications associated with the given supply chain, wherein the alphanumeric activity-related data comprises entity type information attributed to the at least one entity, entity value information attributed to the at least one entity, and identifying information of one or more channels within the given supply chain wherein the alphanumeric activity-related data was triggered, and wherein the multiple applications associated with the given supply chain comprise at least a plurality of one or more fulfillment-related applications, one or more inventory-related applications, one or more shipment-related applications, and one or more orchestration-related applications;
to update the visualization by transforming at least a portion of the monitored alphanumeric activity-related data into graphical data representing entity-related activity across the at least a portion of the two or more distributed event-driven interconnected systems relative to at least one corresponding portion of the expected state transition data of the at least one entity; and
to perform, in connection with at least one of the two or more distributed event-driven interconnected systems, one or more automated actions based at least in part on the updated visualization, wherein performing one or more automated actions comprises using the at least one processing device to identify one or more anomalies in the entity-related activity and automatically execute one or more remedial actions on the at least one of the two or more distributed event-driven interconnected systems in response to identifying the one or more anomalies.

16. The apparatus of claim 15, wherein processing at least a portion of the historical data in the at least one data library comprises processing historical data pertaining to state transition information, action trigger information, and event information.

17. The apparatus of claim 16, wherein monitoring alphanumeric activity-related data associated with the at least one entity within the given supply chain comprises monitoring alphanumeric activity-related data associated with the at least one entity with respect to at least one of one or more state transitions, one or more action triggers, and one or more events.

18. The apparatus of claim 15, wherein generating the visualization comprises determining one or more workflow triggers by processing state transitions for multiple events.

19. The apparatus of claim 15, wherein monitoring alphanumeric activity-related data associated with the at least one entity comprises monitoring inbound event data from multiple channels associated with the given supply chain.

20. The apparatus of claim 19, wherein monitoring inbound event data from multiple channels associated with the given supply chain comprises monitoring inbound event data from two or more of at least one fulfillment order orchestration engine, at least one global outbound and logistics fulfillment system, at least one fulfillment service layer, and at least one inventory system.

\* \* \* \* \*